United States Patent [19]

Stewart

[11] 4,056,880
[45] Nov. 8, 1977

[54] METHOD FOR CONNECTING DYNAMOELECTRIC MACHINE COILS

[75] Inventor: Richard E. Stewart, Pittsburgh, Pa.

[73] Assignee: Westinghouse Electric Corporation, Pittsburgh, Pa.

[21] Appl. No.: 703,738

[22] Filed: July 9, 1976

[51] Int. Cl.² .................................... H02K 15/00
[52] U.S. Cl. ............................. 29/596; 228/140; 228/180 R; 228/190; 310/71
[58] Field of Search ............... 29/596; 228/139, 140, 228/180 R, 190; 174/94 R; 310/71, 260

[56] References Cited

U.S. PATENT DOCUMENTS

| | | | |
|---|---|---|---|
| 3,330,027 | 7/1967 | Kernander et al. | 228/190 X |
| 3,980,910 | 9/1976 | Steinebronn et al. | 310/71 |

*Primary Examiner*—Carl E. Hall

*Attorney, Agent, or Firm*—G. H. Telfer

[57] ABSTRACT

A connector assembly for joining two half coils conductors in the form of straps are joined at one end in electrical contact with the header caps of two water cooled half coils. The unattached ends of each group of conductor straps are tinned with soft solder and interleaved with the straps of the other group. A plate is disposed on both sides of the interleaved joint and a bolt is inserted through both plates and the interleaved joint. The bolt is tightened to produce compressive union between the interleaved straps for good electrical contact. The joint is heated to coalesce the solder with the conductor straps thereby forming a metallurgical bond. The bolt is then torqued to reestablish the initial tightness to ensure a good mechanical and metallurgical joint.

2 Claims, 4 Drawing Figures

METHOD FOR CONNECTING DYNAMOELECTRIC MACHINE COILS

BACKGROUND OF THE INVENTION

1. Field of the Invention

This invention relates to connectors for joining winding conductors of a dynamoelectric machine, and more particularly, to means for electrically and mechanically connecting two water-cooled stator half coils in a turbine generator.

2. Description of the Prior Art

Coils for use in many large dynamoelectric machines, e.g., large turbine generators, have often been formed as a "bench" or subassembly operation and then assembled into the slots of the stator or armature. Often each slot contains a plurality of coil sides and the ends of each coil side extend beyond the length of the slot. To complete a coil, coil ends must be bent so that one coil side which lies in the lower portion of one slot can be joined with the other side of the coil which lies in the upper portion of another slot.

To overcome some of the problems such as coil breakage caused by bending the end turns of the coil, "half" coils or coil sides are often used. In such a half coil construction, each half coil is still formed as a "bench" operation and then assembled into the stator or armature slots. However, in conventional practice the half coils are electrically connected at their ends by conductors which have been soldered into ferrules attached to the half coil water header caps.

The soldering of the conductors into the ferrules must be performed after the half coils are assembled into the slots. The soldering process, performed after coil assembly, is laborious, slow, and often introduces impurities into the joint which cause poor electrical integrity. Because of the time required to heat the joint to an adequate temperature and due to the close proximity of the joint to adjacent insulation systems, much care is required. These disadvantages cause extensive delays in the next stages of assembly of the dynamoelectric machine since further assembly cannot be performed until the joints have passed selected non-destructive tests.

A coil connector which is intended to avoid some of the disadvantages previously mentioned is an "H" shaped apparatus of U.S. Pat. No. 3,192,423. This connector eliminates the need for the coil-to-conductor joints, but it does so while incurring: (1) increased chance for coil damage, and (2) increased difficulty in bending and moving the relatively inflexible half coils into the holder.

SUMMARY OF THE INVENTION

This invention is an improved connector which provides a mechanical and metallurgical joint between the half coils of a dynamoelectric machine. The invention generally comprises an apparatus which supplies and transmits a compressive force to the joint between two groups of electrical conductors in the form of straps which are disposed in an interleaved arrangement and which are further united by formation of a metallurgical bond between the conductors.

This method is an improved procedure for connecting half coils in a dynamoelectric machine. The method generally comprises attaching one end of a group of electrical conductor straps into electrical contact with a half coil, attaching one end of a second group of electrical conductor straps into electrical contact with a second half coil, interleaving the unattached ends of one group of conductors with the unattached ends of the second group of conductors to form a joint, compressing and securing that joint, and forming a metallurgical bond between the two groups of interleaved conductors.

This invention provides improved mechanical strength and decreased electrical resistance due to the interleaving and compression of the connecting conductors. Assembly time in the dynamoelectric machine is also minimized since only one joint is required instead of two during assembly. Additionally, the single joint that is required is not in close proximity to the insulation thus reducing the risk of damage to associated equipment during assembly.

The non-destructive testing for electrical conductivity of the joint is replaced by compressing the joint to a predetermined extent which can be measured with a torque wrench.

BRIEF DESCRIPTION OF THE DRAWINGS

For better understanding of the invention, reference may be had to the preferred embodiment, exemplary of the invention, shown in the accompanying drawings in which.

DESCRIPTION OF THE PREFERRED EMBODIMENT

Figure 1:
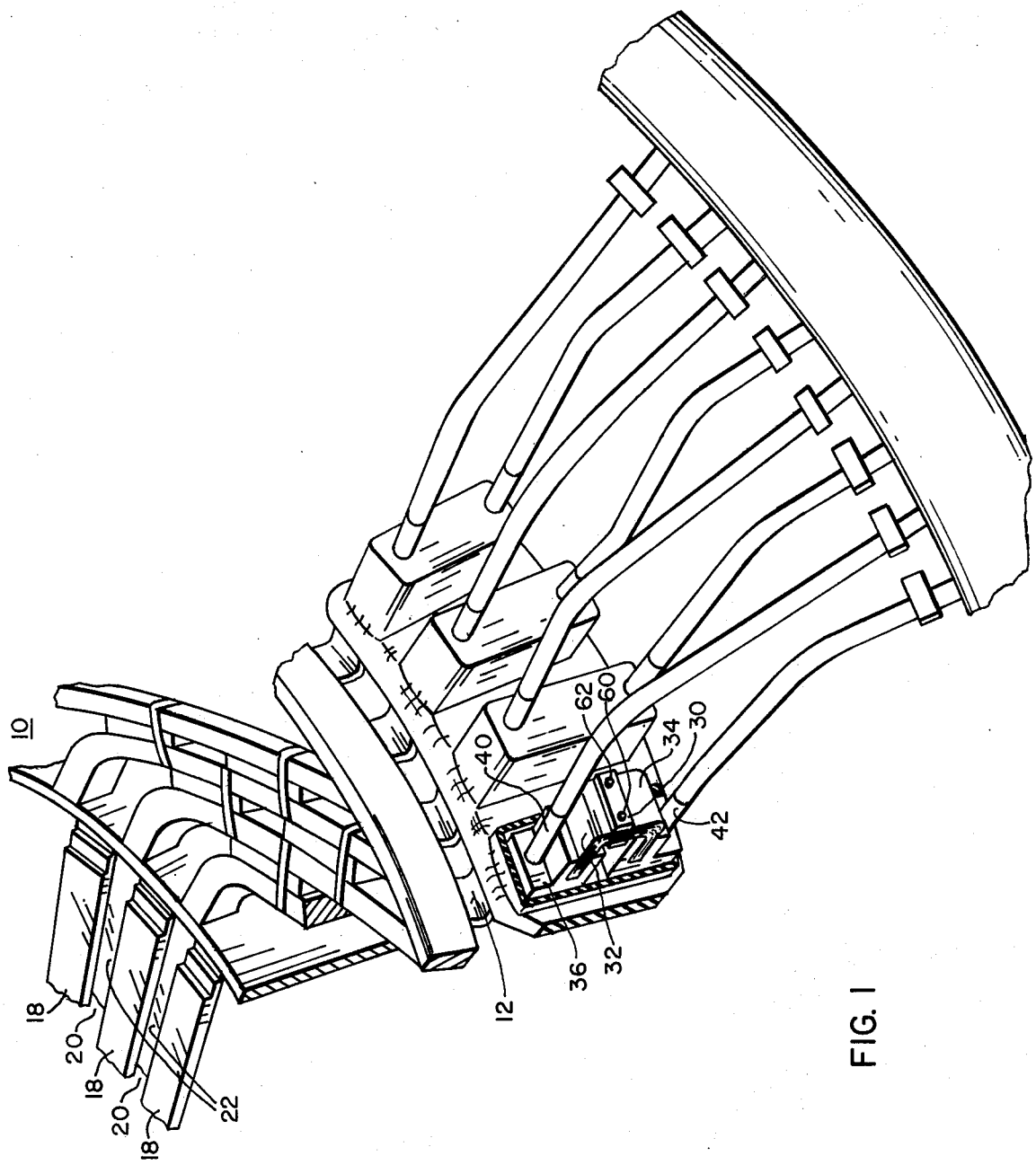
FIG. 1 is a partial isometric end view of a turbine generator in which the invention is incorporated.

Referring to the drawing, the present invention is concerned with a dynamoelectric machine or generator 10 whose half coils 12 and 14 must be connected. In the description which follows the invention is shown embodied in a water-cooled stator of a turbine generator 10.

As shown in FIG. 1, the generator 10 has a laminated stator core 18 of usual construction which is supported within the generator in any suitable manner. The stator core 18 is provided with longitudinal slots 20 in the usual manner for the reception of the high-voltage stator winding 22.

The stator winding 22 of a generator 10 of this type consists of a suitable number of half coils or coil sides 12 and 14, which are of the inner cooled type, two half coils being disposed in each of the slots 20 and the half coils 12 and 14 connected at the ends to form the complete stator winding 22. In accodance with the invention, the half coil connection is made by means of a pair of fasteners or bolts 24 and 26 securing two plates 28 and 30 on opposite sides of a plurality of interleaved electrical conductors 32 and 34 extending from each of two half coil water header caps 36 and 38.

Figure 2:
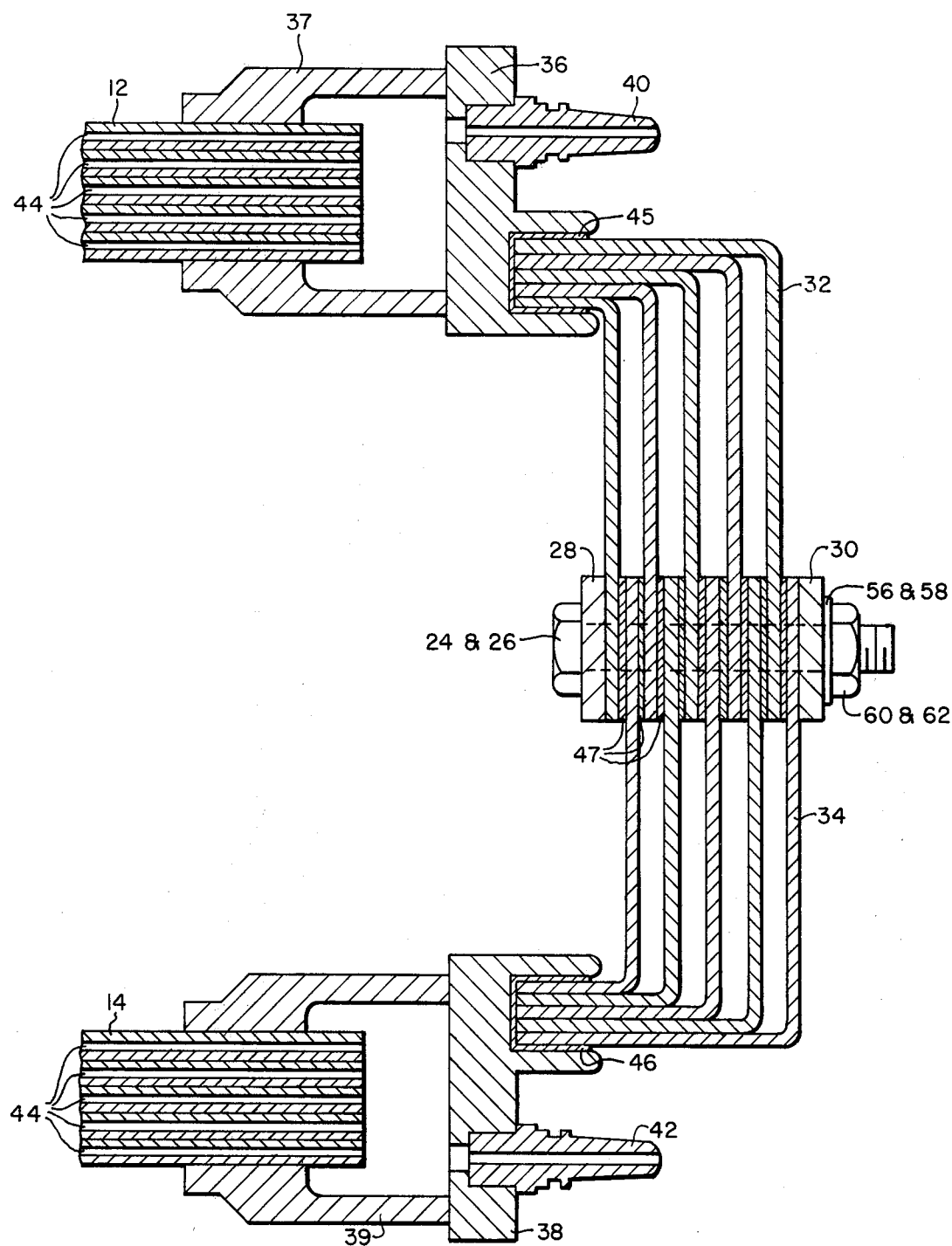
FIG. 2 is a sectioned elevation view of two half coil end turns, two headers, two header caps, and a half coil connector.
Figure 4:
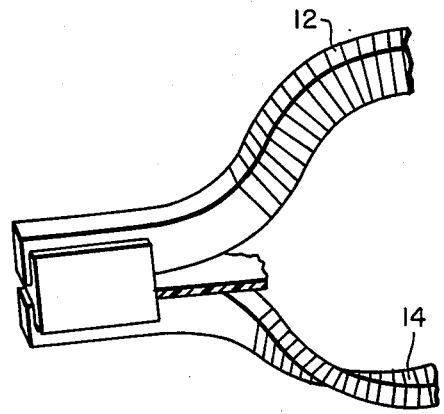
FIG. 4 is a partial isometric sectional view of a prior art half coil connector.

In FIG. 2, there is shown a water header cap 36 for half coil 12 which is connected to another water header cap 38 for half coil 14. It will be understood that one of these half coils 12 will normally be in the bottom of one slot 20 of the stator core 18 and the other half coil 14 will be in the top of a differnet slot. Coolant water enters the water header caps 36 and 38 through fittings 40 and 42 and flows through hollow passages 44 passing out through similar fittings (not shown) on the far end of each half coil. Conductor straps 32 and 34 may, for example, have approximate dimensions of 3 inches wide and one-eighth inch in thickness and are shown in electrical contact with the header caps 36 and 38 which are, in turn, in electrical contact through water headers 37 and 39 with the half coils 12 and 14. The conductor straps 32 and 34 are typically made from copper or other conducting material and may, for example, vary in length from approximately 4.5 inches to 6.5 inches because of the different radii each is bent to form the interleaved joint 40.

Suitable electrical contacts 45 and 46 can be obtained by soldering, brazing or any other metallurgical or mechanical process. There are no temperature constraints or physical size limitations on the formations of the joints 45 and 46 because they can be and preferably are made before the half coils 12 and 14 are assembled in the stator core slots 20. The ends of the conductor straps 32 and 34 which are not attached to the water header caps 36 and 38 are preferably covered with a tinning material 47 such as solder or other metallic substance which has a moderate melting point. The tinned lengths are typically 2.25 inches long depending on the electrical contact area desired. Two elongated holes 48 and 50 which are by example 0.56 inches wide an 1.5 inches long are cut in the tinned portion of each conductor strap 32 and 34 in order to accommodate the passage of two non-magnetic bolts 24 and 26 which are approximately one-sixteenth of an inch smaller than the width of the elongated holes 48 and 50. The elongation allows for manufacturing tolerance between the top water header cap 36 and bottom water header cap 38. After the half coils 12 and 14 are assembled in the stator core slots 20, two non-magnetic plates 28 and 30 with two holes in each are disposed one on each side of the interleaved and tinned conductor strap ends. The plates 28 and 30 by way of example are 1.75 inches wide, 3 inches long, and 0.25 inches thick, each with two holes having a diameter approximately equal to the elongated holes 48 and 50 width. Two non-magnetic bolts 24 and 26 are passed through the generally aligned holes of the plates 28 and 30 and the elongated holes 48 and 50 of the conductor straps 32 and 34. Two non-magnetic Bellville washers or other biasing means 56 and 58 and two non-magnetic nuts 60 and 62 are assembled on the end of the non-magnetic bolts 24 and 26 and the bolts are torqued sufficiently to guarantee electrical integrity utilizing the Bellville washers 56 and 58 as locking devices. The interleaved, tinned joint is heated to a temperature sufficient to melt the tinning substance 47 and the bolts 24 and 26 are then retorqued to the value necessary to insure electrical integrity.

Figure 3:
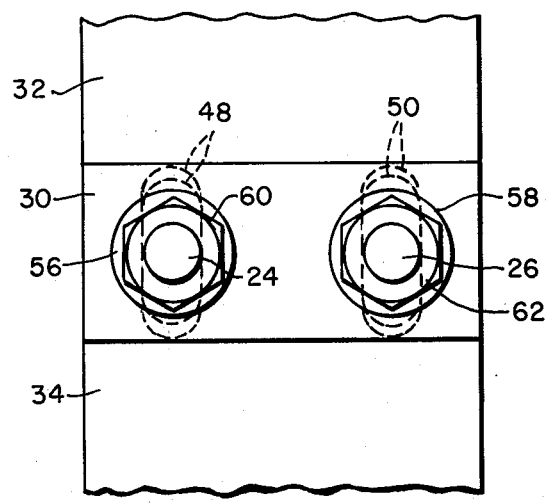
FIG. 3 is a partial elevation view of the split coil connector taken 90° from FIG. 2.

The conductors 32 and 34 are made in the form of a plurality of thin straps as shown in FIGS. 2 and 3 in order to: (1) facilitate the manipulation of the conductors into the form of a joint, and (2) provide numerous surfaces of electrical contact thus lowering the current flux across the interfaces and maintaining a cooler joint.

It will now be apparent that an improved half coil connector has been provided which provides electrical integrity from both the mechanical compression of the joint and the metallurgical bond between the conductors 32 and 34 in the joint. This new single connection between half coils 12 and 14 also decreases assembly time and eliminates the need for testing of the joint.

What we claim is:

1. A method of joining the end portions of a selected pair of half coils of a dynamoelectric machine one to another thereby establishing a mechanical and electrical union between the end portions of said selected pair of coils by means of a plurality of electrical conductors, each of said conductors including first and second end portions, said method comprising:
   a. connecting the first end portion of each of a plurality of electrical conductors in electrical contact with a selected one of said half coil end portions;
   b. connecting the first end portion of each of a second plurality of electrical conductors in electrical contact with the remaining half coil end portion of said selected pair of coils;
   c. interleaving the second electrical conductor end portions of said first and second plurality of electrical conductors in electrical contact, one with another;
   d. forming a metallurgical bond between said interleaved electrical conductor end portions;
   e. compressing the interleaved electrical conductor end portions sufficiently to provide electrical integrity after said conductor end portions have been metallurgically bonded; and
   f. securing the interleaved electrical conductor end portions to maintain said compression.

2. The method of claim 1 further comprising: compressing said interleaved electrical conductor end portions after interleaving said electrical conductor second end portions and before forming said metallurgical bond.

* * * * *